United States Patent
Zock (10) Patent No.: US 11,117,075 B2
(45) Date of Patent: Sep. 14, 2021

(54) COMPOSITE FILTER SOCK ANCHORS, COMPOST FILTER SOCK ASSEMBLIES AND METHOD OF FORMING SAME

(71) Applicant: MKB Company, LLC, Groveport, OH (US)

(72) Inventor: Michael A. Zock, Saxonburg, PA (US)

(73) Assignee: MKB COMPANY, LLC, Groveport, OH (US)

( * ) Notice: Subject to any disclaimer, the term of this patent is extended or adjusted under 35 U.S.C. 154(b) by 46 days.

(21) Appl. No.: 16/211,549

(22) Filed: Dec. 6, 2018

(65) Prior Publication Data
US 2019/0176059 A1 Jun. 13, 2019

Related U.S. Application Data

(60) Provisional application No. 62/595,287, filed on Dec. 6, 2017.

(51) Int. Cl.
*E02B 3/12* (2006.01)
*E02D 5/80* (2006.01)
(Continued)

(52) U.S. Cl.
CPC ............ *B01D 24/042* (2013.01); *C02F 1/001* (2013.01); *C02F 1/286* (2013.01); *E02B 3/122* (2013.01);
(Continued)

(58) Field of Classification Search
CPC . E02B 3/122; E02B 3/125; E02D 5/80; E02D 17/202; E02D 2600/30; B01D 24/042; E04H 12/2215
(Continued)

(56) References Cited

U.S. PATENT DOCUMENTS

| | | | | |
|---|---|---|---|---|
| 855,584 A | * | 6/1907 | Neale | ......................... E02B 3/14 405/16 |
| 1,454,649 A | * | 5/1923 | Murton | ............... E04H 12/2215 52/153 |

(Continued)

FOREIGN PATENT DOCUMENTS

DE 1634045 * 4/1971

OTHER PUBLICATIONS

Faucette, et al. 2005, Evaluation of Stormwater from Compost and Conventional Erosion Control Practices in Construction Activities, Journal of Soil and Water Conservation, 60:6, 288-297.
(Continued)

*Primary Examiner* — Christopher Upton
(74) *Attorney, Agent, or Firm* — Blynn L. Shideler; Krisanne Shideler; BLK Law Group (57) ABSTRACT

A compost filter sock assembly comprising a filter sock and compost filter anchor system comprising one of i) an interconnected series of compost filter sock anchors alternating on the downstream and upstream side of the filter sock, wherein the compost filter sock anchors are interconnected with strapping between adjacent compost filter sock anchors on opposed sides of the filter sock such that the strap traverses the filter sock; or ii) a downstream wooden stake having a fin coupled thereto that extends laterally on both sides of the wooden stake.

17 Claims, 5 Drawing Sheets

(51) Int. Cl.
  *B01D 24/04* (2006.01)
  *C02F 1/00* (2006.01)
  *E02D 17/20* (2006.01)
  *C02F 1/28* (2006.01)
  *E04H 12/22* (2006.01)
  *C02F 103/00* (2006.01)

(52) U.S. Cl.
  CPC ............... *E02B 3/125* (2013.01); *E02D 5/80* (2013.01); *E02D 17/202* (2013.01); *E04H 12/2215* (2013.01); *B01D 2201/0415* (2013.01); *C02F 2103/001* (2013.01); *C02F 2201/002* (2013.01); *E02D 2600/30* (2013.01)

(58) Field of Classification Search
  USPC ........ 210/170.03, 747.3; 405/16, 259.1, 262, 405/302.4, 302.6, 302, 7; 52/155, 156, 52/153, 165; 248/156, 508, 530
  See application file for complete search history.

(56) References Cited

U.S. PATENT DOCUMENTS

| | | | | |
|---|---|---|---|---|
| 1,543,390 A * | 6/1925 | Funk | ................... | E04H 12/2215 52/153 |
| 2,071,779 A | 2/1937 | Willing | | |
| 2,201,279 A | 5/1940 | Willing | | |
| 3,342,444 A * | 9/1967 | Nelson | ................ | E04H 12/2215 248/156 |
| 3,775,924 A * | 12/1973 | McClure, Jr. | ........ | E04H 12/2215 52/155 |
| 3,957,098 A | 5/1976 | Hepworth et al. | | |
| 4,044,525 A | 8/1977 | Forsgren et al. | | |
| 5,338,131 A * | 8/1994 | Bestmann | ............... | E02B 3/125 405/16 |
| 5,661,932 A * | 9/1997 | Barefield | .................. | E02D 5/80 52/155 |
| 6,343,446 B1 * | 2/2002 | Beard | ................. | E04H 12/2215 52/165 |
| 2002/0131826 A1 * | 9/2002 | Spangler | ................... | E02B 3/04 405/302.4 |
| 2004/0079699 A1 * | 4/2004 | Engwer | ................... | E02B 3/125 210/170.03 |
| 2008/0034682 A1 * | 2/2008 | Carpenter | ............ | E02D 17/202 52/155 |
| 2016/0138297 A1 * | 5/2016 | Gibbs | ................. | E04H 12/2215 248/530 |
| 2017/0138007 A1 * | 5/2017 | Melby, III | .............. | E02B 3/125 |
| 2017/0204582 A1 * | 7/2017 | Allard | ..................... | E02B 3/125 |

OTHER PUBLICATIONS

Tyler, R. and B. Faucette 2005, Organic BMPs used for Stormwater Management—Filter Media Test Results from Private Certification Program Yield Predictable Performance, U.S. Composting Council 13th Annual Conference and Trade Show, Jan. 2005, San Antonio, Tex.

* cited by examiner

COMPOSITE FILTER SOCK ANCHORS, COMPOST FILTER SOCK ASSEMBLIES AND METHOD OF FORMING SAME

CROSS-REFERENCE TO RELATED APPLICATION

This application claims the benefit of U.S. Provisional Patent Application Ser. No. 62/595,287, filed Dec. 6, 2017, titled "Composite Filter Sock Anchors, Compost Filter Sock Assemblies and Method of Forming Same", which is incorporated herein by reference.

BACKGROUND OF THE INVENTION

1. Field of the Invention

The present invention relates to compost filter sock assemblies, and more particularly to compost filter sock anchors and methods of forming the same.

2. Background Information

A compost filter sock (also called a compost filter sleeve, silt sleeve, filter sock, compost filter tube, compost mesh sleeve, or similar terms) is a type of contained compost filter berm. A compost filter sock is a water permeable mesh tube or netting sleeve (also referenced as compost filter netting) filled with mostly composted (or compostable) material and that is conventionally placed perpendicular to sheet-flow runoff to control erosion and retain sediment in disturbed areas.

While the term compost filter sock has become common usage, the definition of "compost" filling these socks is often loosely used. In some applications it refers to material that has undergone allegedly very specified composting procedures, and thus is actually a compost material. In other applications, it references organic material (wood chips, brush, grasses, leaves needles, weeds, and combination of these and others) that can or will undergo composting, and still be considered compost filling for a compost filter sock. Composts used in compost filter socks are conventionally made from a variety of feed-stocks, including municipal yard trimmings, food residuals, separated municipal solid waste, bio-solids, and manure. The organic material can vary widely and be influenced by what is readily available. Seaweed or ground up corn cobs, as representative example, are some unlikely, but possible materials. The use of these material is largely depended upon availability. Wood chips and grasses are the most commonly used compost filling for compost filter socks. Inorganic material (sand, clay and/or stones) may be mixed in with organic materials in the compost filter sock, and these are still compost filter socks. The compost of the present invention is intended to encompass all of the above possibilities, and anything else currently known in the relevant art.

The idea of an erosion control device formed as a mesh structure filled with compost material as the filler goes at least as far back as 1935, in U.S. Pat. Nos. 2,079,779 and 2,201,279, which are incorporated herein by reference, wherein the use of brush or bundled weeds (straw grasses) in a mesh structure forms the compost filler.

Over the years, improvements have been developed giving further detail to the desired compost filler material, the desired netting opening size for the compost filter netting, the length and diameter size of compost filter socks, filling arrangements and installation instructions. See, for example U.S. Pat. No. 3,957,098, which is incorporated herein by reference, disclosing a 1972 development referred to as "an erosion control bag" having a porosity of 10 to 35 cubic feet per minute so that air and water may escape from the bag as water and a filler are pumped into the bag. U.S. Pat. No. 4,044,525, which is incorporated herein by reference, discloses a 1975 development wherein wood chips are blown from the discharge tube of the wood chipper straight into a tube-like structure which has perforated walls allowing the air carrying the wood chips to escape from the structure while the chips are retained inside.

Within the last 35 years, tubular compost filter socks filled with straw and hammered wood have become popular erosion control measures. In the late 1990's filter berms where introduced. The filter berm was basically a triangular windrowed pile of decomposing organic material from land clearing, tree-trimming, or other sources. Some of the people doing work early in the evolution and proliferation and re-introduction of modern compost filter sock were John Engwer at FilterMitt, Kevin Lane at Lane ECS, Tom Truelsen at Soil Tek, several inventors at Filtrexx, Keith and Kevin Weaver at Weaver Express, and Doug Cadwell at River Valley Organics. Soon a "modern day" tubular mesh fabric, or compost filter netting, holding in place the berm material was introduced and the term "Compost Filter Sock" began to be widely used. Today's compost filter sock is, however, a modern day version of the erosion control devices set forth in the original Willing patents.

The modern compost filter socks are typically oval in cross section, once formed and inplace, although the compost filter netting is often manufactured circular in cross section prior to filling. A compost filter sock, provides a three-dimensional filter that retains sediment and other pollutants (e.g., suspended solids, nutrients, motor oil, etc.) while allowing the cleaned water to flow through. For reference, see Faucette, et al. 2005, *Evaluation of Stormwater from Compost and Conventional Erosion Control Practices in Construction Activities*, Journal of Soil and Water Conservation, 60:6, 288-297; and Tyler, R. and B. Faucette 2005, *Organic BMPs used for Stormwater Management-Filter Media Test Results from Private Certification Program Yield Predictable Performance*, U.S. Composting Council 13$^{th}$ Annual Conference and Trade Show, January 2005, San Antonio, Tex.

The compost filter socks are used in place of traditional sediment and erosion control tools, such as silt fencing or straw bale barriers. Compost filter socks are generally placed along the perimeter of a site, or at intervals along a slope, to capture and treat storm-water that runs off as sheet flow. Compost filter socks are flexible and can be filled in place or pre-filled and moved into position, making them especially useful on steep or rocky slopes where installation of other erosion control tools is not feasible. There is greater surface area contact with soil than typical sediment control devices, thereby reducing the potential for runoff to create rills under the device and/or create channels carrying unfiltered sediment. Additionally, compost filter socks can be laid adjacent to each other, perpendicular to storm-water flow, to reduce flow velocity and soil erosion. Compost filter socks can also be used on pavement as inlet protection for storm drains and to slow water flow in small ditches.

Compost filter socks used for erosion control are most commonly 12 inches in diameter, although 8 inch, 18 inch, 24 inch and even 36 inch diameter compost filter socks are used in some applications. The smaller 8 inch diameter filter socks are commonly used as storm-water inlet protection. The "diameter" of the compost filter sock is typically given as the diameter of the unfilled compost filter netting used to form the compost filter sock, because when the compost filter sock is in position, gravity will make the cross section take an oval or "D" shape in which the width of the compost filter sock exceeds the original diameter and the height of the compost filter sock is less than the original diameter.

Compost filter socks can be what are termed "vegetated" or "un-vegetated". Vegetated compost filter socks can be left in place to provide long-term filtration of storm-water as a post-construction best management practice. The vegetation grows into the slope, further anchoring the compost filter sock. Un-vegetated compost filter socks are often cut open (cutting through the netting) when the project is completed, and the compost filling is spread around the site as soil amendment or mulch. The compost filter netting is then disposed of unless it is biodegradable.

According to the U.S. Environmental Protection Agency's National Pollutant Discharge Elimination System description of Construction Site Storm-water Runoff Control, three advantages the compost filter sock has over traditional sediment control tools, such as a silt fence, are: i) Installation does not require disturbing the soil surface (no trenching), which reduces erosion; ii) It is easily removed; and iii) The operator must dispose of only a relatively small volume of material, if any. These advantages lead to cost savings, either through reduced labor or disposal costs.

Further, the use of compost provides additional benefits. The compost retains a large volume of water, which helps prevent or reduce rill erosion and aids in establishing vegetation on the filter sock. The mix of particle sizes in the compost filter material retains as much, or more, sediment than traditional perimeter controls, such as silt fences or hay bale barriers, while allowing a larger volume of clear water to pass through. Silt fences often become clogged with sediment and form a dam that retains storm-water, rather than letting the filtered storm-water pass through. In addition to retaining sediment, compost can retain pollutants such as heavy metals, nitrogen, phosphorus, oil and grease, fuels, herbicides, pesticides, and other potentially hazardous substances, significantly improving the downstream water quality. Nutrients and hydrocarbons adsorbed and/or trapped by the compost filter can be naturally cycled and decomposed through bioremediation by microorganisms commonly found in the compost matrix.

Compost filter socks are applicable to construction sites or other disturbed areas where storm-water runoff occurs as sheet flow. Common industry practice for compost filter devices is that drainage areas do not exceed 0.25 acre per 100 feet of device length and flow does not exceed one cubic foot per second. Compost filter socks can be used on steeper slopes with faster flows if they are spaced more closely, stacked beside and/or on top of each other, made in larger diameters, or used in combination with other storm-water controls, such as compost blankets.

Compost filter socks offer a large degree of flexibility for various applications. A large number of qualitative studies have reported the effectiveness of compost filter socks in removing "settleable" solids and total suspended solids from storm-water. These studies have consistently shown that compost filter socks are generally more effective than traditional erosion and sediment control systems. Compost filter socks are often used in conjunction with compost blankets to form a storm-water management system. Together, these two systems retain a very high volume of storm-water, sediment, and other pollutants.

Figure 1A:
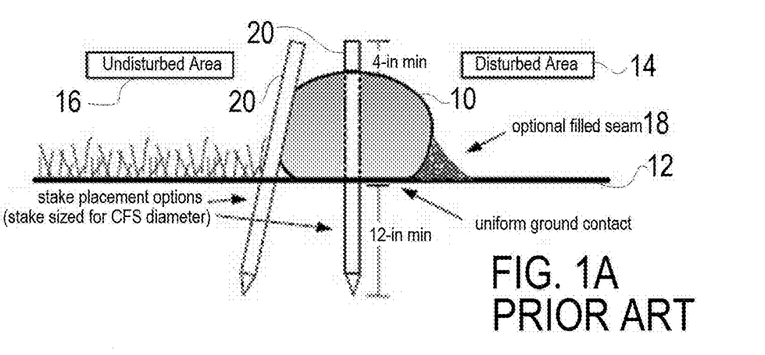
FIG. 1A is a schematic sectional view of the installation of a conventional compost filter sock.

FIGS. 1A-D show conventional prior art compost filter sock installation practice. Once the compost filter sock 10 is filled and put in place, it should be anchored to the slope. FIG. 1A schematically shows a sectional view of the installation of a conventional compost filter sock 10 on the ground 12 separating a disturbed area 14, or upstream side 14, from an undisturbed area 16, or downstream side 16. The flexible tubular compost filter sock 10 will then establish a large uniform contact area with the ground 12 and give a general D shape to the installed sock 10. The upstream side of the sock 10 may further include a filled seam 18. For anchoring the sock 10 in place the preferred anchoring method is to drive stakes 20 through the center of the sock 10 at regular intervals (typically 10'); alternatively or in addition, stakes 10 can be placed on the downstream side of the sock 10, which are herein called downstream stakes 10 to differentiate from the stakes 10 extending through the sock 10. Within the meaning of this application the installed compost filter sock 10 together with the anchoring system (stakes 20) is referenced as the compost filter sock assembly.

Figure 1B:
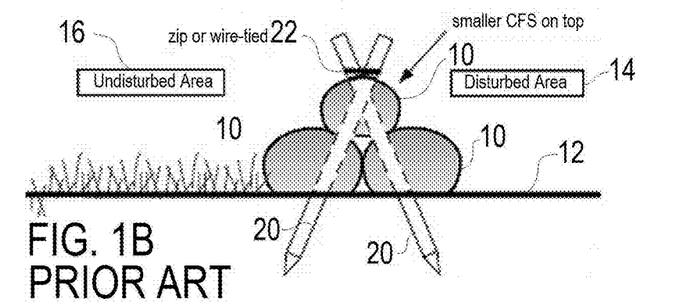
FIG. 1B is a schematic sectional view of the installation of an alternative conventional compost filter sock.

FIG. 1B schematically shows a sectional view of the installation of an alternative conventional compost filter sock assembly on the ground 12 which again is separating a disturbed area 14, or upstream side 14, from an undisturbed area 16, or downstream side 16. In this configuration two base or ground socks 10 support a typically smaller diameter sock on the top thereof in a pyramidal fashion. This allows for an increased height of the assembly to accommodate flow above the working height of one sock. The preferred anchoring system here is again stakes 20 through the center of the socks 10 at spaced locations, but a single stake 20 will be directed through the center of the upper sock 10 and one of the lower socks 10 and a second immediately adjacent stake 20 will be directed through the center of the upper sock 10 and the other of the lower socks 10 and these two immediately adjacent stakes 20 may be coupled together with a member 22 such as a zip tie or wire tie. Downstream stakes 10 can be placed on the downstream side of the sock assembly here as desired or needed.

Figure 1C:
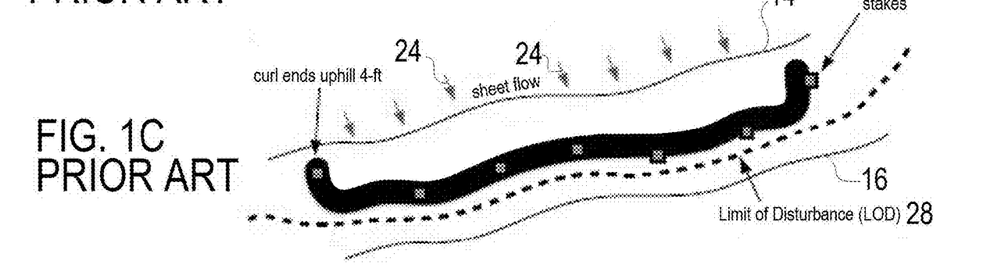
FIG. 1C is a schematic top plan view of the installation of a conventional compost filter sock.
Figure 1D:
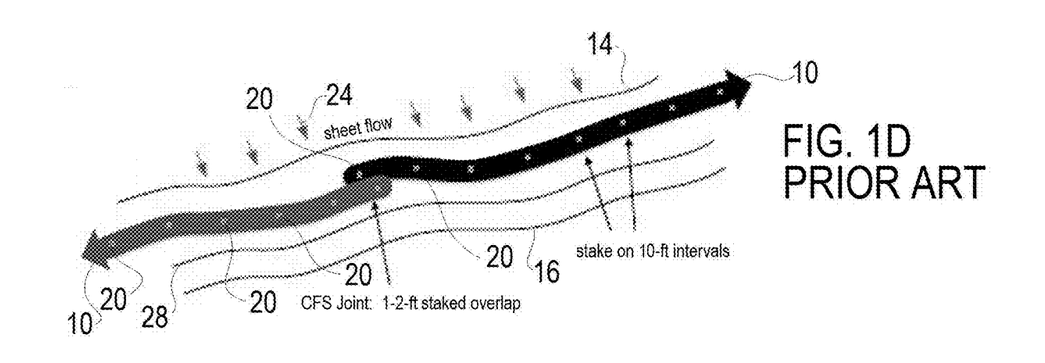
FIG. 1D is a schematic top plan view of the installation of a conventional compost filter sock at a coupling of adjacent socks.

FIG. 1C schematically shows a top plan view of the installation of a conventional compost filter sock 10 on the ground 12 separating an upstream side 14, from the downstream side 16. The upstream side 14 is the side of water runoff or flow 24 whereas the downstream side 16 is the side having filter water flow 26 of runoff filtered by the sock 10. The sock 10 is typically placed at or about the "limit of disturbance" 28, which is why the downstream side 16 may be referenced as the undisturbed area 16 and the upstream side 14 may be referenced as the disturbed area 14. As shown, the ends of the compost filter sock 10 may be directed upslope toward the side 14, generally 4' or so, to prevent storm-water from running around the end of the sock 10. FIG. 1D is a schematic top plan view of the installation of a conventional compost filter sock 10 at a coupling, also called joint, of adjacent socks 10, in which the adjacent socks 10 are overlapped, typically 1-2', to prevent flow 24 bypassing between the socks 10. The compost filter sock 10 may be vegetated by incorporating seed into the compost prior to placement in the filter sock. Since compost filter socks 10 do not have to be trenched into the ground, they can be installed on frozen ground or even on cement or other "inhospitable" surfaces.

Compost filter socks, like all erosion control devices, can come under significant amounts of pressure with water runoff and there is a need for cost effective improved anchoring systems. Cost effective is a significant issue in erosion control technology as an expensive solution to any problem will simply not be widely adopted in practice and thus practically ineffective for its intended purpose.

SUMMARY OF THE INVENTION

A compost filter sock assembly comprising a filter sock and compost filter anchor system comprising one of i) an interconnected series of compost filter sock anchors alternating on the downstream and upstream side of the filter sock, wherein the compost filter sock anchors are interconnected with strapping between adjacent compost filter sock anchors on opposed sides of the filter sock such that the strap traverses the filter sock; or ii) a downstream wooden stake having a fin coupled thereto that extends laterally on both sides of the wooden stake.

One aspect of the present invention provides a compost filter sock assembly comprising a filter sock including a water permeable flexible tubular netting filled with compost; and compost filter anchor system comprising at least one of i) an interconnected series of compost filter sock anchors alternating on the downstream and upstream side of the filter sock, wherein the compost filter sock anchors are interconnected with strapping between adjacent compost filter sock anchors on opposed sides of the filter sock such that the strap traverses the filter sock; and ii) a downstream stake having a fin coupled thereto that extends laterally on both sides of a stake body.

One aspect of the present invention provides a compost filter sock anchor comprising a downstream stake having a fin coupled thereto that extends laterally on both sides of a stake body.

One aspect of the present invention provides a method of forming a compost filter sock anchor comprising the steps of: providing a wooden stake with a stake body; forming a plastic fin; Coupling the fin to the stake body wherein the fin extends laterally on both sides of a stake body, wherein the fin increases a ground facing surface area of the stake body perpendicular to the plane of the fin by at least 100%

These and other advantages of the present invention will be clarified in the description of the invention taken together with the attached figures in which like reference numeral represent like elements throughout.

DETAILED DESCRIPTION OF THE INVENTION

It is noted that, as used in this specification and the appended claims, the singular forms "a," "an," and "the" include plural referents unless expressly and unequivocally limited to one referent. The various embodiments and examples of the present invention as presented herein are each understood to be non-limiting with respect to the scope of the invention.

The present invention according to a first embodiment provides compost filter sock assembly comprising a filter sock 10 and compost filter anchor system comprising an interconnected series of compost filter sock anchors 30 alternating on the downstream 16 and upstream side 14 of the filter sock 10, wherein the compost filter sock anchors 30 are interconnected with strapping 40 between adjacent compost filter sock anchors 30 on opposed sides of the filter sock 10 such that the strap traverses the filter sock 10. The filter sock 10 is a water permeable flexible tubular netting filled with compost. The netting as used in the sock 10 of the present invention is that such as preferably available from the applicant under the Diamond Sock® brand. The term compost is intended to define the broadest definition of compost within the field of compost filter socks as discussed above. Additionally, the details of making the conventional compost filter socks are also described in some detail in U.S. Pat. Nos. 7,226,240, 7,452,165 and U.S. Pat. Publication 2016-0279541 which are incorporated herein by reference.

The compost filter sock assembly of the present invention uses an integrated or interconnected series of compost filter sock anchors 30 alternating on the downstream 16 and upstream side 14 of the filter sock 10 as shown. The compost filter sock anchors 30 are interconnected with strapping 40 between adjacent compost filter sock anchors 30 on opposed sides (14, 16) of the filter sock 10 such that the strap 40 traverses the filter sock 10 shown in FIGS. 2 and 5-7.

Figures 2, 3, 4:
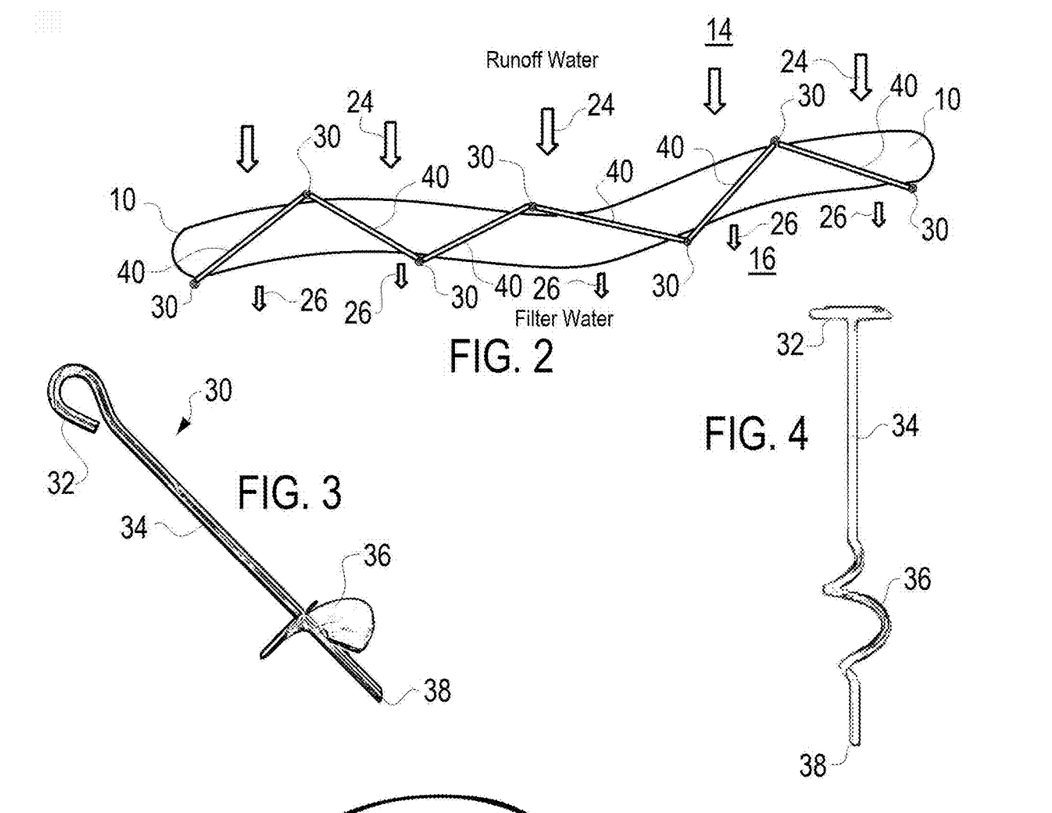
FIG. 2 is a schematic top view of a compost filter sock assembly according to a first embodiment of the present invention.
FIG. 3 is a perspective view of a compost filter sock anchor for use with the compost filter sock assembly of FIG. 2.
FIG. 4 is a perspective view of a compost filter sock anchor for use with the compost filter sock assembly of FIG. 2.
Figure 5:
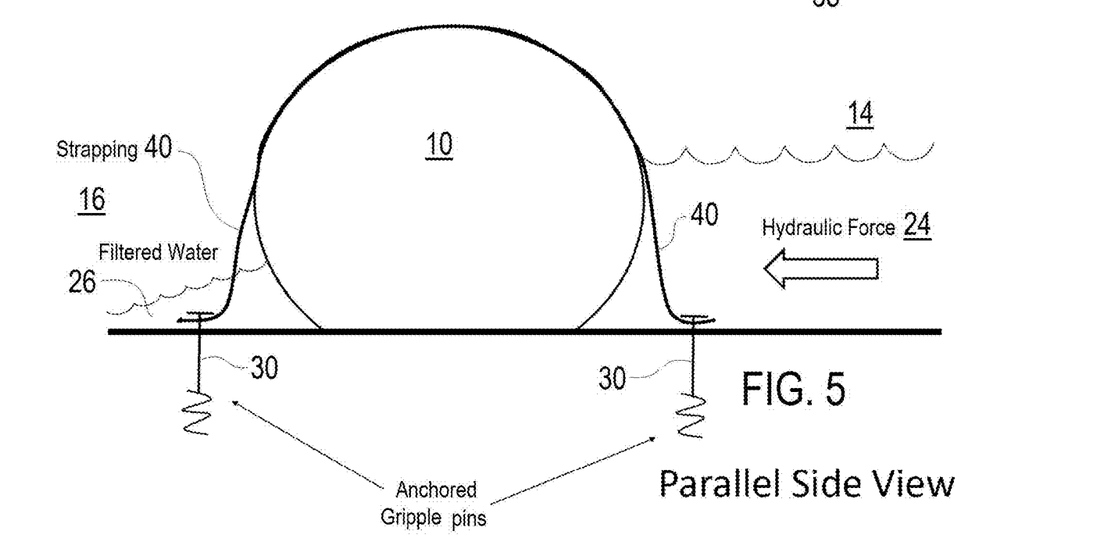
FIG. 5 is a schematic sectional view of the compost filter sock assembly of FIG. 2.

The compost filter sock anchors 30 in the first embodiment are preferably metal ground anchor pins as shown in FIG. 3 or 4 each having a loop 32 at the top to connect the strapping 40 and to assist in the anchor pin installation, a shaft 34 and a pullout prevention feature 36. The pullout prevention feature 36 may be an enlarged spiral element between the shaft 34 and distal end 38. The compost filter sock anchors 30 in the first embodiment can effectively be formed as ground anchor pins from Gripple Construction, specifically a high load anchoring pin as shown in FIG. 4 that is quick to install, and is designed to minimize reworking loose pins, exhibits superior pull out performance compared to traditional pins and stakes, and ensure close contact with the ground 12.

The strapping 40 extends from one compost filter sock anchor 30 to the next compost filter sock anchors 30 on the opposite sides so the strapping 40 straddles and traverses the filter sock 10. The strapping 40 is preferably one of webbing, rope or metal wire. Webbing is preferred over rope (nylon of cotton) or metal wire as it is less likely to damage the netting of the sock 10. The webbing may be formed of industrial webbing often found in tie down devices and may be ½"-4" webbing of nylon, polyester, or cotton.

The anchoring system of the first embodiment has a number of improvements over conventional staking 10 because: conventional stakes 10 only provide horizontal stability whereas the present method of the first embodiment provides both horizontal and vertical stability; the compost filter sock anchors 30 in the first embodiment are integrated with adjacent anchors 30 via the strapping 40 to allow the adjacent anchors 30 to be utilized to prevent sock 10 movement at or between two anchors 30; the netting of the sock 10, also called the containment geotextile, is not torn or pierced as it would be when putting a stake 10 in the middle, and such tearing is a common failure point of conventional socks 10; stakes 10 can rot in the ground before the end of the job; and stakes are often incorrectly sized or incorrectly installed while the ground strapping 40 of the present invention eliminates this.

This anchoring system of the first embodiment has some added cost issues but the anchors 30 can be easily removed and reused after the useful life of the filter sock assembly. Further the removal of sediment buildup may be more difficult with the anchoring system utilized here and de-installation will take more time, although anchors can be re-used. Further, metal pins forming anchors 30 potentially left in a Right-Of-Way may be unwanted. Finally some filter socks 10 may shrink or settle while installed and over time this would loosen the snugness of the strapping 40. Despite these drawbacks this compost filter sock assembly of the first embodiment may be particularly useful in select applications such as heavy slopes and large water volumes.

Figure 6:
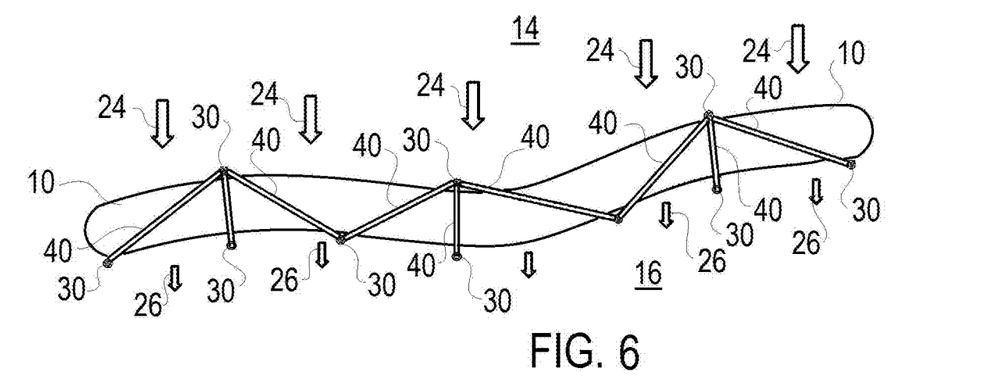
FIG. 6 is a schematic top view of a compost filter sock assembly according to a modified version of the first embodiment of the present invention.
Figure 7:
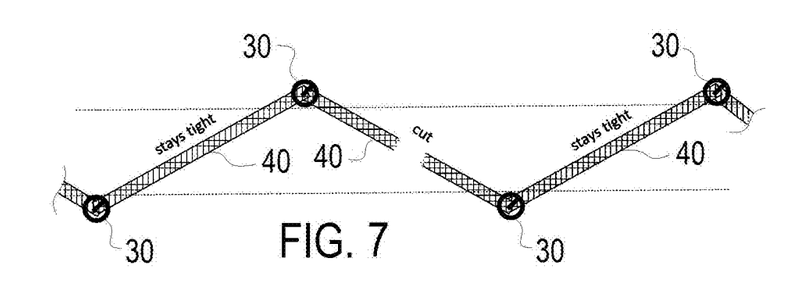
FIG. 7 is a schematic top view of the compost filter sock assembly of FIG. 2 representing strap tension with a severed strapping in one section of the first embodiment of the present invention.

The present invention can easily add additional bracing or strapping 40 and anchors 30 as shown in the modified embodiment of FIG. 6 to increase stability of the compost filter sock assembly of the invention. Further, as illustrated in FIG. 7 the strapping 40 should further extend between and be coupled to the anchors 30 in a manner that severing a section or breaking of one section does not affect the adjacent sections. Essentially the spaced sections are independent.

Figure 8:
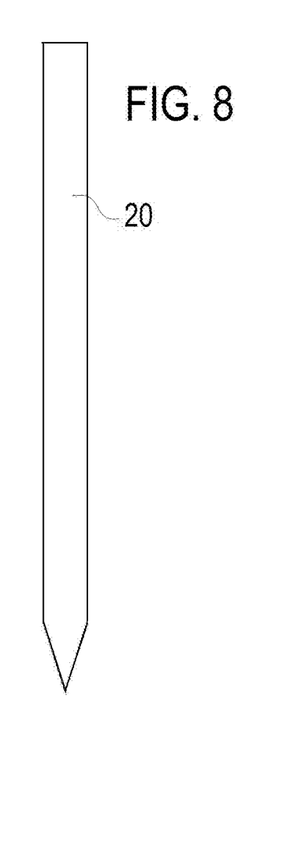
FIG. 8 is a schematic side elevation view of a wooden stake used in forming a downstream stake for use in a compost filter anchor system according to one embodiment of the present invention.
Figure 9:
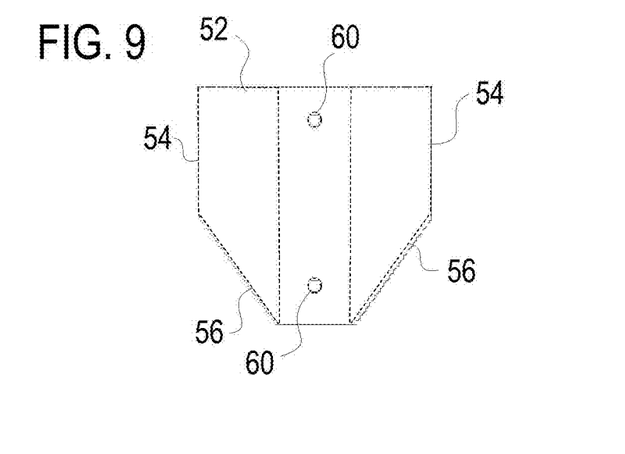
FIG. 9 is a schematic side elevation view of a plastic fin used in forming a downstream stake for use in a compost filter anchor system according to one embodiment of the present invention.

The filter sock assembly of the initial invention may not be required in all applications and can be cost prohibitive for certain applications. A second compost filter sock anchor according to the present invention uses conventional wooden stake 20 as represented in FIG. 8. The stake 20 may be, for example, a 1½" square oak stake 20. In a second embodiment of an anchor a lateral fin 50 is coupled to the stake 20, and in particular coupled to the downstream side of a downstream stake. A sample fin 50 is shown in FIG. 9 and includes a top edge 52 of about 7" and a pair of side edges 54 extending perpendicular therefrom for about 5". A pair of tapered lower side edges 56 extend to a bottom edge 58 that is about 1½" and centered on the fin 50 and about 8" below the top edge 52. The tapered lower edges 56 are intended to improve ground entry of the downstream stake.

The fin 50 may include opening 60 to receive nails 62 or staples for coupling the to the stake 20.

Figure 10:
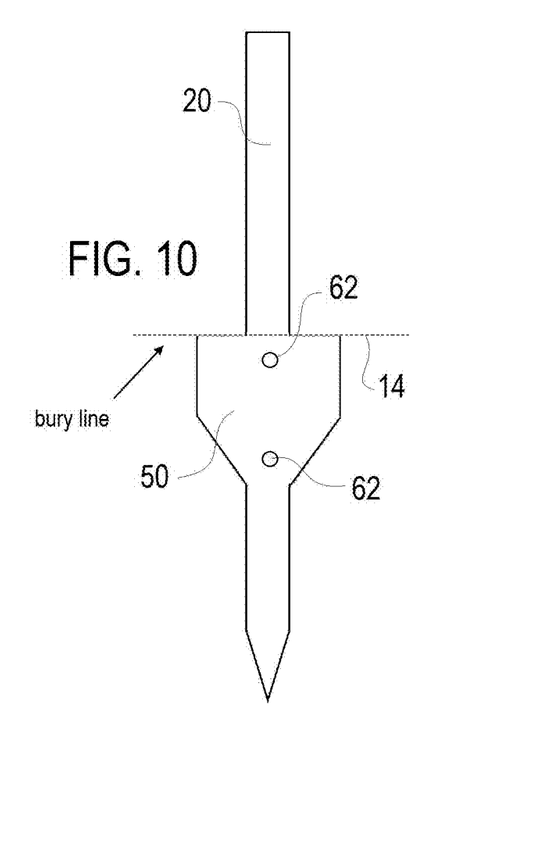
FIG. 10 is a schematic side elevation view of a downstream stake for use in a compost filter anchor system according to one embodiment of the present invention.

The significance of the fin 50 is when coupled to the stake 20 the fin 50 extends laterally on both sides of a stake body. The fin 50 when coupled to the stake 20 as shown in FIG. 10 forms a downstream stake for use in a compost filter anchor system according to one embodiment of the present invention. The fin 50 as shown increases a ground facing surface area of the stake body perpendicular to the plane of the fin 50 by about 200%. Specifically the fin 50 adds an additional 24 sq inches of surface area for "push resistance" in addition to the 12 sq. inches formed by the stake body without the fin 50. This greatly improves the ability of the downstream stake formed with fin 50 to withstand lateral movement. A fin 50 should increase the ground facing surface area of the stake body perpendicular to the plane of the fin 50 by at least 100%, and preferably at least 150% with 200% easily being accommodated as shown. The fin 50 is coupled to the stake 20 via nails 62 through formed holes 60, or even staples through holes 60, and the provision of the holes prevents cracking of the fin during attachment. Alternatively, a reduced thickness area may be provided in the fin 50 to facilitate stapling or nailing of the fin 50 to the stake 20. The fin 50 is preferably formed of plastic to be easily formed in a cost effective manner. The fin 50 may have the beveled lowered end formed by edges 56 to facilitate driving the stake 20 and fin 50 into the ground. In operation, the fin 50 increases the effective surface area of the stake 20 in the flow direction of the water and increases the resistance of a single downstream stake 20 with fin 50 to movement in this direction by substantial amounts.

Figure 11:
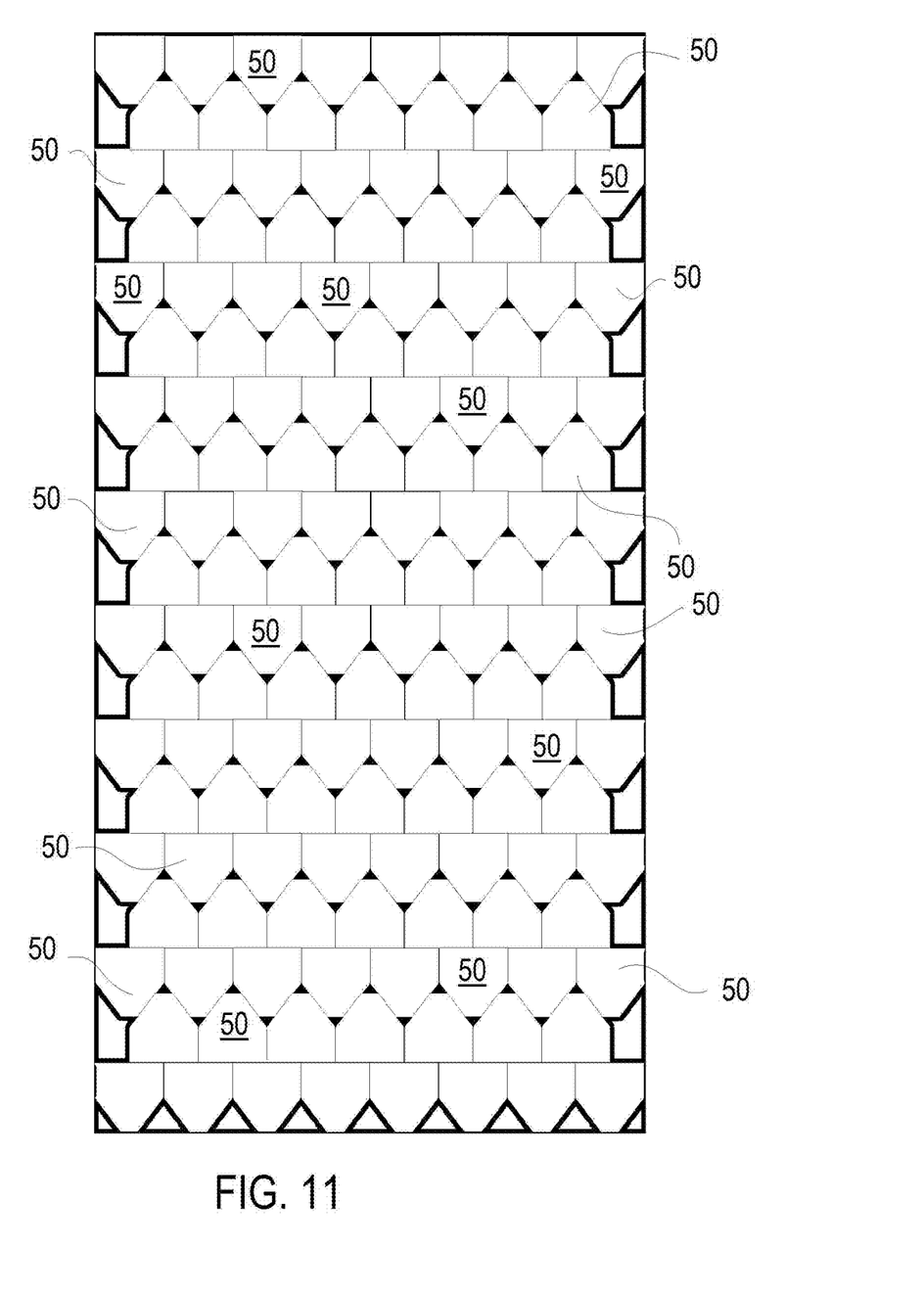
FIG. 11 is a schematic top plan view of a sheet of plastic used in forming a plurality of fins for forming a plurality of downstream stakes for use in a compost filter anchor system according to one embodiment of the present invention.

The plastic formation of the fins 50 allows a large number to be die cut (or water jet cut or other shaping method) from a sheet of plastic as shown in FIG. 11 in which 143 fins 50 are cut from a 4×8 plastic sheet. The plastic fin 50 may include additives to promote oxi-degradation such that the fin 50 will decompose in less than 5 years and generally less than 3 years such that the wooden stake 20 and plastic fin 50 may be left in the ground.

As an alternative the entire stake with fin shown in FIG. 10 could be formed as a single molded configuration, however that limits the use of the resulting stake to only a downstream stake. The preferred embodiment is to use attachable fins 50, such that the stakes 20 are universal and only the fins 50 need to be maintained and used to form downstream stakes as needed. The fins 50 are more easily stored and transported than the downstream stake with fin coupled thereto.

In operation the fin 50 can be selectively used by the installers for select downstream stakes as needed. It can be used with the anchoring system shown in FIGS. 2, 5 and 6, with conventional sock 10 staking arrangements and with combinations thereof. In practice the strapping anchoring system of FIGS. 2,5 and/or 6 may be used in only a part of a sock arrangement that is expected to see high flows, while the remainder of the sock is anchored with conventional stakes 20 and downstream stakes with fins 50 are used where downstream stakes are desired. The present invention intends to provide cost effective options for installation to allow compost filter socks to more easily and effectively be implemented in many areas.

The present invention has been described with reference to specific details of particular embodiments thereof. It is not intended that such details be regarded as limitations upon the scope of the invention except insofar as and to the extent that they are included in the accompanying claims. A number of variations to the present invention will be apparent to those of ordinary skill in the art and these variations will not depart from the spirit and scope of the present invention. The scope of the invention is defined by the appended claims and equivalents thereto.

I claim:

1. A compost filter sock assembly comprising
a filter sock including a water permeable flexible tubular netting filled with compost; and
compost filter anchor system comprising an interconnected series of compost filter sock anchors alternating on the downstream and upstream side of the filter sock, wherein the compost filter sock anchors are interconnected with strapping between adjacent compost filter sock anchors on opposed sides of the filter sock such that the strap traverses the filter sock, wherein a plurality of the upstream anchors include a first strap extending across the top of the filter sock to an adjacent downstream side sock anchor in a first direction along the filter sock and a second strap extending across the top of the filter sock to an adjacent downstream side sock anchor in a direction opposite the first direction along the filter sock.

2. A compost filter sock assembly according to claim 1 wherein each compost filter sock anchor is a metal ground anchor pin having a loop at the top to connect the strapping and to assist in the anchor pin installation, a shaft and a pullout prevention feature.

3. A compost filter sock assembly according to claim 2 wherein the strapping is one of webbing, rope or wire.

4. A compost filter sock assembly according to claim 2 wherein the strapping is ½"-4" webbing of nylon, polyester, or cotton.

5. A compost filter sock assembly according to claim 1 wherein the compost filter anchor system includes at least one downstream stake having a fin coupled thereto that extends laterally on both sides of a stake body.

6. A compost filter sock assembly according to claim 5 wherein the fin increases a ground facing surface area of the stake body perpendicular to the plane of the fin by at least 100%.

7. A compost filter sock assembly according to claim 5 wherein the fin increases a ground facing surface area of the stake body perpendicular to the plane of the fin by at least 150%.

8. A compost filter sock assembly according to claim 5 wherein the fin increases a ground facing surface area of the stake body perpendicular to the plane of the fin by about 200%.

9. A compost filter sock assembly according to claim 5 wherein the fin is plastic.

10. A compost filter sock assembly according to claim 9 wherein the fin includes pre-formed holes to accommodate attachment to the stake body.

11. A compost filter sock assembly according to claim 9 wherein the fin includes additives to promote oxi-degradation whereby the fin will decompose in less than 5 years.

12. A compost filter sock anchor comprising a downstream stake having a plastic fin including additives to promote oxi-degradation whereby the fin will decompose in less than 5 years coupled thereto that extends laterally on both sides of a wooden stake body, wherein the fin comprises a planar first face and an opposed planar second face with peripheral edges connecting the planar first face and the planar second face, the fin including a fin attachment mechanism between the planar first face and the opposed planar second face and not extending beyond the planar first face and the opposed planar second face, wherein the fin attachment mechanism is configured to receive at least one mechanical fastener to secure the fin to the stake body.

13. A compost filter sock anchor according to claim 12 wherein the fin attachment mechanism includes pre-formed holes to accommodate attachment to the stake body with the at least one mechanical fastener.

14. A compost filter sock anchor according to claim 12 wherein the fin increases a ground facing surface area of the stake body perpendicular to the plane of the fin by at least 100%.

15. A compost filter sock anchor according to claim 12 wherein the fin increases a ground facing surface area of the stake body perpendicular to the plane of the fin by at least 150%.

16. A compost filter anchor assembly according to claim 12 wherein the fin increases a ground facing surface area of the stake body perpendicular to the plane of the fin by about 200%.

17. A method of forming a compost filter sock anchor comprising the steps of:
providing a wooden stake with a stake body;
forming a planar plastic fin including additives to promote oxi-degradation whereby the fin will decompose in less than 5 years, wherein the fin comprises a planar first face and an opposed planar second face with peripheral edges connecting the planar first face and the planar second face, the fin including a fin attachment mechanism between the planar first face and the opposed planar second face and not extending beyond the planar first face and the opposed planar second face;
Coupling the fin to the stake body with at least one mechanical fastener received through the fin attachment mechanism to secure the fin to the stake body, wherein the fin extends laterally on both sides of a stake body, wherein the fin increases a ground facing surface area of the stake body perpendicular to the plane of the fin by at least 100%.

* * * * *